Nov. 21, 1961   J. W. HIERONYMUS   3,009,261
SYPHON PIPE SHOE
Filed Aug. 28, 1958

INVENTOR
JOHN W. HIERONYMUS
BY Beaman & Beaman
ATTORNEY

United States Patent Office 3,009,261
Patented Nov. 21, 1961

3,009,261
SYPHON PIPE SHOE
John W. Hieronymus, Three Rivers, Mich., assignor to The Johnson Corporation, Three Rivers, Mich., a corporation of Michigan
Filed Aug. 28, 1958, Ser. No. 757,764
3 Claims. (Cl. 34—125)

The invention relates to a syphon pipe condensate pickup shoe for steam heated rotary dryer drums and particularly pertains to a pick-up shoe for a rotating syphon pipe.

In the art of steam heated dryer drums for paper machines and the like, syphon pipes have long been used to remove the condensate from the drum and means to aid condensate pick-up such as scoops and flow directional means are common with stationary syphon pipes where the condensate is removed from the lowest part of the drum. The speed of modern paper making mills has necessitated extensive redesign of condensate removal equipment in that as the dryer drums must be rotated faster than with previous slow speed mills the condensate rides on the inner periphery of the drum at velocities of 1,000 ft./min. and above with a 60″ drum under certain condensate conditions and forms a uniform film inside the drum rather than a puddle in the bottom. Such behavior is called "rimming" and lowers the drying capacity of the drum due to the insulating effect of the film which is now interposed between the live steam and the drum shell. To remove such "rimmed" condensate it is necessary to employ a rotating syphon pipe, e.g. a pipe which revolves with the drum capable of removing the condensate continuously during drum rotation and as it is desirable to remove the condensate as soon as possible, to keep the thickness of the film to a minimum, the construction of the end of the syphon pipe or pick-up shoe is of considerable importance.

It is thus an object of the invention to provide a syphon pipe pick-up shoe which is capable of removing rimmed condensate at a minimum thickness.

A further object of the invention is to provide a rotary syphon pipe shoe which incorporates a scooping action during initial starting revolutions of the dryer drum to aid in removal of steam condensate and which functions to pick up rimmed condensate due to pressure differential within the drum and syphon pipe.

A further object of the invention is to provide a rotary syphon pipe shoe which minimizes the tendency for the condensate to flash yet is capable of effectively removing condensate in large quantities.

Figure 1:
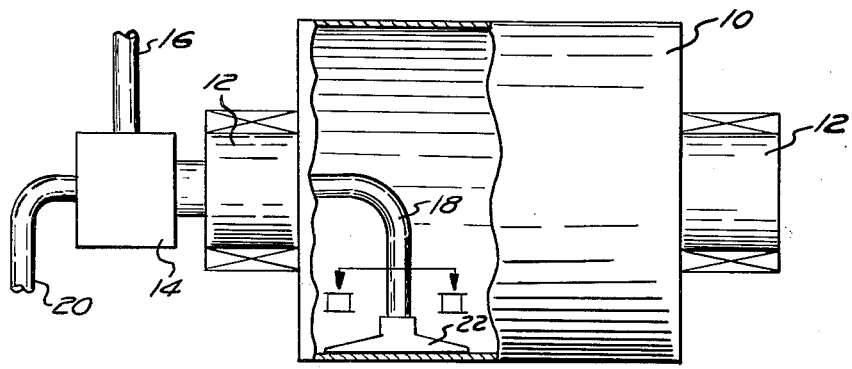
Figure 2:
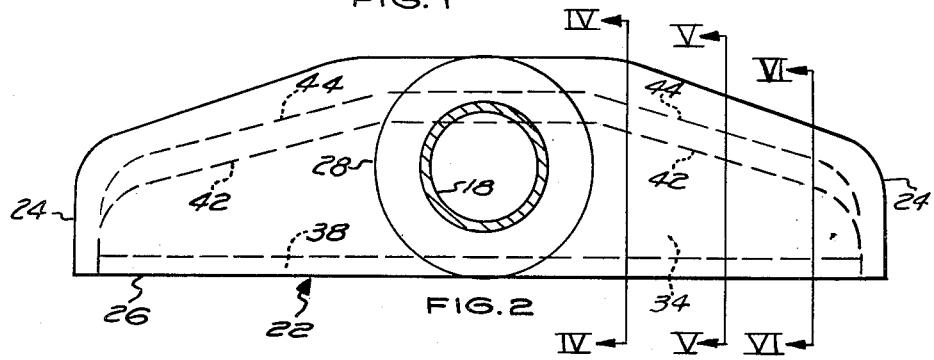
Figure 3:
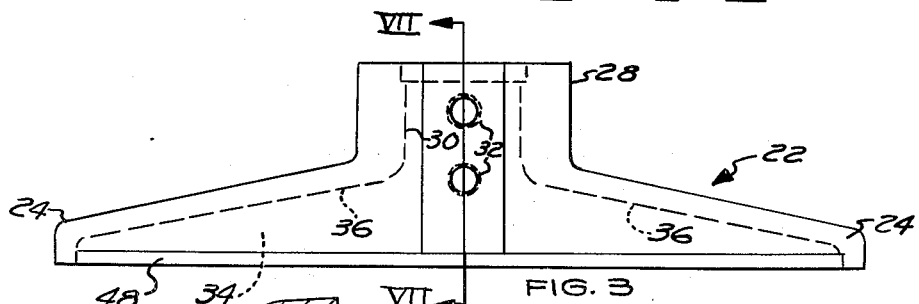
Figures 4, 5, 6:
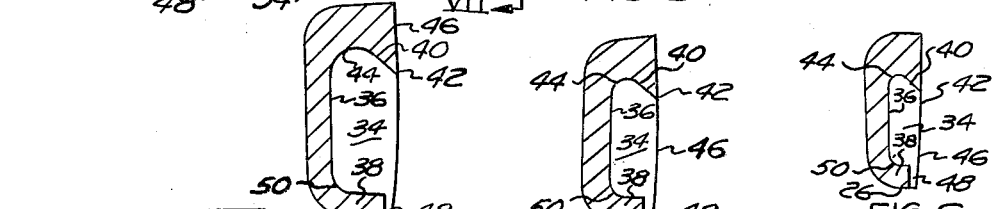
Figure 7:
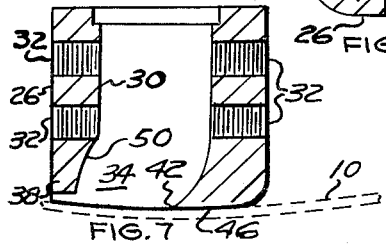

These and other objects of the invention will become apparent from the following description and accompanying drawings wherein:

FIG. 1 is a partly sectional view of a typical installation employing a syphon pipe and pick-up shoe, FIG. 2 is a plan view of the shoe of the invention taken on the line II—II of FIG. 1, FIG. 3 is a front elevational view of the shoe of the invention, FIGS. 4, 5 and 6 are sectional views taken on the sections IV—IV, V—V and VI—VI, respectively of FIG. 2, and FIG. 7 is a sectional view taken along line VII—VII of FIG. 3.

FIG. 1 illustrates a typical arrangement of the components utilized with a rotating dryer drum and includes the drum 10 which is provided with concentric journals 12, one of which is hollow, which are rotatably supported on suitable bearings. Power means (not shown) are drivingly connected to the drum for the rotation thereof and in a paper mill many drums of this type are employed in series to contact the paper sheet to dry the paper. The drum is heated by steam introduced into the drum interior by a rotary steam joint 14 affixed to the hollow journal and supplied by the steam line 16. A syphon pipe 18 is supported within the drum 10 for rotation therewith and communicates within the joint 14, with the condensate drain pipe 20. Sealing means within the joint 14 are provided by a rotary seal between the relative rotating components of the joint in the conventional manner as typified by United States Patent 2,700,558.

The end of the syphon pipe 18 is provided with a pick-up shoe 22 which contacts the inner periphery of the drum 10 and picks up the liquid steam condensate within the drum for discharge into the syphon pipe and the drain pipe 20. In accordance with the invention the shoe 22 preferably takes the form shown in FIGS. 2–7 wherein the shoe body may be constructed from a corrosion resistant material such as manganese bronze. The shoe 22 is substantially elongated whereby it may be employed with journal inserted syphon pipes and is located within the drum such that the longitudinal axis of the shoe is parallel to the drum axis. As observed from the top, FIG. 2, the shoe 22 is of maximum width at the center and tapers at the rear toward each end 24 to a minimum width. The front 26 of the shoe is planar across the entire shoe length and it is this portion 26 which faces the direction of drum rotation.

Vertically, FIG. 3, the shoe 22 is of minimum height adjacent the ends 24 and uniformly increases in height from both ends toward the syphon pipe boss 28 which comprises the upper central portion of the shoe. The boss 28 is provided with a cylindrical vertical bore 30 into which the lower end of the syphon pipe 18 is inserted and affixed therein by a plurality of set screws 32 threaded into tapped holes within the boss 28 intersecting bore 30.

A chamber 34 is defined within the shoe 22 in communication with the bore 30 and hence the syphon pipe 18. The chamber 34 is of a shape similar to that of the shoe itself, increasing in depth from the ends of the shoe and increasing in height toward the center. As seen in FIGS. 4–6 the upper portion of the chamber is defined by the surface 36, the front surface by the wall 38 and the rear wall by the surface 40. As will be observed the rear chamber wall 40 is inclined upwardly toward the rear of the shoe such that the lower edge 42 of surface 40 is forward with respect to the arcuate portion 44 whose radius increases toward the bore 30.

The wall 38 terminates short of the lower surface 46 of the shoe to define a slot 48 in the front in communication with the chamber 34. The slot 48 extends the length of the chamber and is of uniform height throughout its length and is of a relative limited height, for instance a slot 6 inches in length is only 3/32 inches high. The inner periphery of the drum 10 defines the lower surface of the chamber 34 and the lower surface 46 of the shoe is slightly convex to conform to the arc of the drum, it being understood that the end walls 24 and rear wall of the shoe define the lower shoe surface 46.

The junction of the front wall 38 and the upper surface 36 is also radiused as at 50 and increases in value to a maximum at the portion of the chamber directly below bore 30, thus as seen in FIG. 7 the radii of the arcuate portion 44 and radius 50 are greatest at that point subjected to the maximum flow capacity. Thus as the condensate will enter the chamber 34 throughout the slot 48 the quantity of liquid is greatest at the center of the shoe as all the condensate must be removed through bore 30 and syphon pipe 18, yet due to the uniform increase in area of the chamber 34 toward the boss 28 the velocity and pressures within the chamber will be substantially uniform and flashing of the condensate minimized.

Initially, after the drum has been stationary for a period of time a puddle of condensate will form in the lower region of the drum and will remain in substantially puddle form when the drum is being rotated up to the operating speed. During this starting phase the syphon pipe, rotating with the drum, will be brought into contact with the puddle with considerable force and the shoe will function as a scoop, e.g. the condensate will be forced into slot 48, strike lower edge 42 which is in contact with the inner drum periphery and be deflected upwardly and toward bore 30 due to the chamber configuration and be forced out through the syphon pipe by the lower pressure of the condensate removal system with respect to the pressure within the drum.

Once the drum reaches a sufficient velocity to cause the condensate to "rim" the shoe ceases to act as a scoop as the condensate will be stationary with respect to the drum 10 and shoe 22 constituting a uniform film on the inner periphery of the drum. At this time the condensate will be forced into the slot 48 and chamber 34 by differential pressure only. As the slot 48 is directly adjacent the inner drum periphery the condensate film will be removed quickly and kept to a minimum thickness insuring efficient use of the steam.

The chamber 34 will permit the condensate to enter the syphon pipe 18 with little turbulence due to the radii 44 and 50 and the inclined rear surface 40 which also aids in preventing flashing.

It will thus be understood that the invention provides a condensate pick-up shoe which functions during puddling and rimming of the condensate, minimizes flashing and turbulence within the shoe and maintains the condensate to a very thin film. While various modifications to the illustrated embodiment may be apparent to those skilled in the art it is intended that the invention be defined only by the scope of the following claims.

I claim:

1. In a condensate pick-up shoe for use with a syphon pipe within a rotating dryer drum, a body member affixed to the syphon pipe in engagement with the inner drum periphery, a closed chamber defined within said body member in communication with the syphon pipe, said chamber being defined by front, rear and side walls, an upper inner surface and the inner periphery of the drum, a central vertical bore within said body having a defining surface in unrestricted communication with said chamber adapted to receive the syphon pipe and of a size approximately equal to that of the syphon pipe, said rear wall tapering rearwardly from said side walls having surfaces converging into the surface defining said bore to provide a uniformly increasing chamber depth, said upper surface tapering upwardly from said side walls converging into the surface defining said bore to provide a uniformly increasing chamber height, and a slot of uniform height defined in said front wall adjacent to the inner drum periphery in communciation with said chamber throughout the entire length thereof.

2. In a condensate pick-up shoe as in claim 1 wherein the portion of the rear wall adjacent the inner periphery of the drum is inclined toward the front wall.

3. In a condensate pick-up shoe as in claim 2 wherein the junction of said front and rear walls with the chamber upper surface is radiused, the magnitude of the radii uniformly increasing from said side walls to said bore.

References Cited in the file of this patent

UNITED STATES PATENTS

| | | |
|---|---|---|
| 1,586,220 | Rowley et al. | May 25, 1926 |
| 1,919,416 | Cram | July 25, 1933 |
| 2,049,050 | Cram | July 28, 1936 |
| 2,150,132 | Sandwell | Mar. 7, 1939 |
| 2,420,824 | Hornbostel et al. | May 20, 1947 |
| 2,791,038 | Armstrong | May 7, 1957 |
| 2,793,385 | Ortega | May 28, 1957 |